US010112613B2

(12) United States Patent
Hunt et al.

(10) Patent No.: US 10,112,613 B2
(45) Date of Patent: Oct. 30, 2018

(54) SYSTEMS AND METHODS FOR MANAGING TORQUE

(71) Applicant: Ford Global Technologies, LLC, Dearborn, MI (US)

(72) Inventors: Ryan Hunt, Ferndale, MI (US); Jonathan Andrew Butcher, Farmington Hills, MI (US); Dale Scott Crombez, Livonia, MI (US); William David Treharne, Ypsilanti, MI (US); Deborah Sue Lienau, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 245 days.

(21) Appl. No.: 15/042,465

(22) Filed: Feb. 12, 2016

(65) Prior Publication Data

US 2017/0232969 A1 Aug. 17, 2017

(51) Int. Cl.
*B60W 30/18* (2012.01)
*B60T 8/17* (2006.01)
(Continued)

(52) U.S. Cl.
CPC ......... *B60W 30/18054* (2013.01); *B60T 8/17* (2013.01); *B60W 10/02* (2013.01); *B60W 10/04* (2013.01); *B60W 10/08* (2013.01); *B60W 10/184* (2013.01); *B60W 20/00* (2013.01); *B60W 20/40* (2013.01); *B60W 30/18027* (2013.01); *B60W 30/18118* (2013.01);
(Continued)

(58) Field of Classification Search
CPC ..... B60W 30/18054; B60W 30/18118; B60W 30/18027; B60W 10/04; B60W 10/02; B60W 20/40; B60W 10/184; B60W 20/00; B60W 10/08; B60W 2710/083; B60W 2720/10; B60W 2510/1005; B60W 2720/30; B60W 2520/30; B60W 2540/10; B60T 8/17; B60T 2260/04; B60T 2201/06; B60K 6/20

See application file for complete search history.

(56) References Cited

U.S. PATENT DOCUMENTS

| 6,679,810 | B1 * | 1/2004 | Boll ........................ B60T 7/122 |
| | | | 477/191 |
| 7,695,401 | B2 | 4/2010 | Soliman et al. |
| 7,743,860 | B2 | 6/2010 | Soliman et al. |
| 8,396,618 | B2 | 3/2013 | Cikanek et al. |
| 2009/0018739 | A1 * | 1/2009 | Ohmori ................... B60T 7/122 |
| | | | 701/70 |
| 2011/0136625 | A1 * | 6/2011 | Yu .......................... B60W 10/06 |
| | | | 477/185 |
| 2014/0365054 | A1 * | 12/2014 | Yamamoto ............ F02D 41/065 |
| | | | 701/22 |
| 2016/0185254 | A1 * | 6/2016 | Ariyoshi .................. B60K 6/48 |
| | | | 701/22 |

(Continued)

FOREIGN PATENT DOCUMENTS

| EP | 2757005 A2 | 7/2014 |
| WO | 2013112179 A1 | 8/2013 |

*Primary Examiner* — David J Hlavka
(74) *Attorney, Agent, or Firm* — David B. Kelley; Brooks Kushman P.C.

(57) ABSTRACT

A method of managing torque at a vehicle standstill includes outputting torque from a powertrain to satisfy a driver torque demand. The method also includes, in response to a nonzero torque demand resulting in vehicle standstill, applying a friction brake to maintain the vehicle standstill and substantially reducing output torque of the powertrain during friction brake application. The method further includes satisfying driver torque demand using the powertrain and releasing the friction brake in response to the driver torque demand deviating from the nonzero torque demand by more than a predetermined amount.

6 Claims, 3 Drawing Sheets

(51) Int. Cl.
*B60W 10/08* (2006.01)
*B60W 10/184* (2012.01)
*B60W 20/00* (2016.01)
*B60W 20/40* (2016.01)
*B60W 10/02* (2006.01)
*B60W 10/04* (2006.01)
*B60K 6/20* (2007.10)

(52) U.S. Cl.
CPC .............. *B60K 6/20* (2013.01); *B60T 2201/06* (2013.01); *B60T 2260/04* (2013.01); *B60W 2510/1005* (2013.01); *B60W 2520/04* (2013.01); *B60W 2540/10* (2013.01); *B60W 2710/083* (2013.01); *B60W 2720/10* (2013.01); *B60W 2720/30* (2013.01); *Y02T 10/7275* (2013.01)

(56) References Cited

U.S. PATENT DOCUMENTS

| | | | |
|---|---|---|---|
| 2016/0304096 A1* | 10/2016 | Khafagy | B60W 30/18109 |
| 2016/0368497 A1* | 12/2016 | Irie | B60W 10/06 |
| 2017/0066437 A1* | 3/2017 | Yamamoto | B60K 6/48 |
| 2017/0072959 A1* | 3/2017 | Bergin | B60W 30/143 |
| 2017/0113693 A1* | 4/2017 | Bularz | B60W 10/06 |
| 2017/0267243 A1* | 9/2017 | Chang | B60W 10/06 |
| 2017/0267246 A1* | 9/2017 | Hashimoto | B60K 6/26 |

\* cited by examiner

SYSTEMS AND METHODS FOR MANAGING TORQUE

TECHNICAL FIELD

The present disclosure relates to managing torque output of an electric powertrain.

BACKGROUND

In a conventional internal combustion powertrain vehicle it may be desirable to output positive wheel torque to hold the vehicle at a standstill condition. This condition may occur, for example, when a driver attempts to hold the vehicle position at a standstill on an incline using only the accelerator pedal. The powertrain may include a torque converter which allows the engine output shaft to spin while the drive shaft remains still, until sufficient torque is transferred by the fluid connection of the torque converter to move the vehicle forward. Also, the fluid connection of a torque converter allows the engine to spin at vehicle standstill without causing substantial wear on powertrain components.

A disconnect clutch can also be used to vary the torque transferred from the engine to the drive shaft. For example varying the clutch pressure in order to "slip" the clutch can vary the amount of torque transferred to the drive shaft. However slipping the clutch can increase clutch surface temperature and in turn affect clutch durability.

SUMMARY

A method includes outputting torque from a powertrain to satisfy a driver torque demand. The method also includes, in response to a nonzero torque demand resulting in vehicle standstill, applying a friction brake to maintain the vehicle standstill and substantially reducing output torque of the powertrain during friction brake application. The method further includes satisfying driver torque demand using the powertrain and releasing the friction brake in response to the driver torque demand deviating from the nonzero torque demand by more than a predetermined amount.

A vehicle includes a powertrain to output torque at a wheel and a friction brake to resist wheel rotation. The vehicle also includes a controller programmed to apply the friction brake and deactivate the powertrain in response to receiving an accelerator pedal input causing the powertrain to output a nonzero standstill torque resulting in zero vehicle speed while in a motive transmission gear.

A vehicle includes a powertrain to provide torque at a wheel and a friction brake to resist rotation of the wheel. The vehicle also includes a controller programmed to apply the friction brake to hold vehicle position and substantially reduce output torque of the powertrain in response to receiving a driver torque demand less than a first torque threshold.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
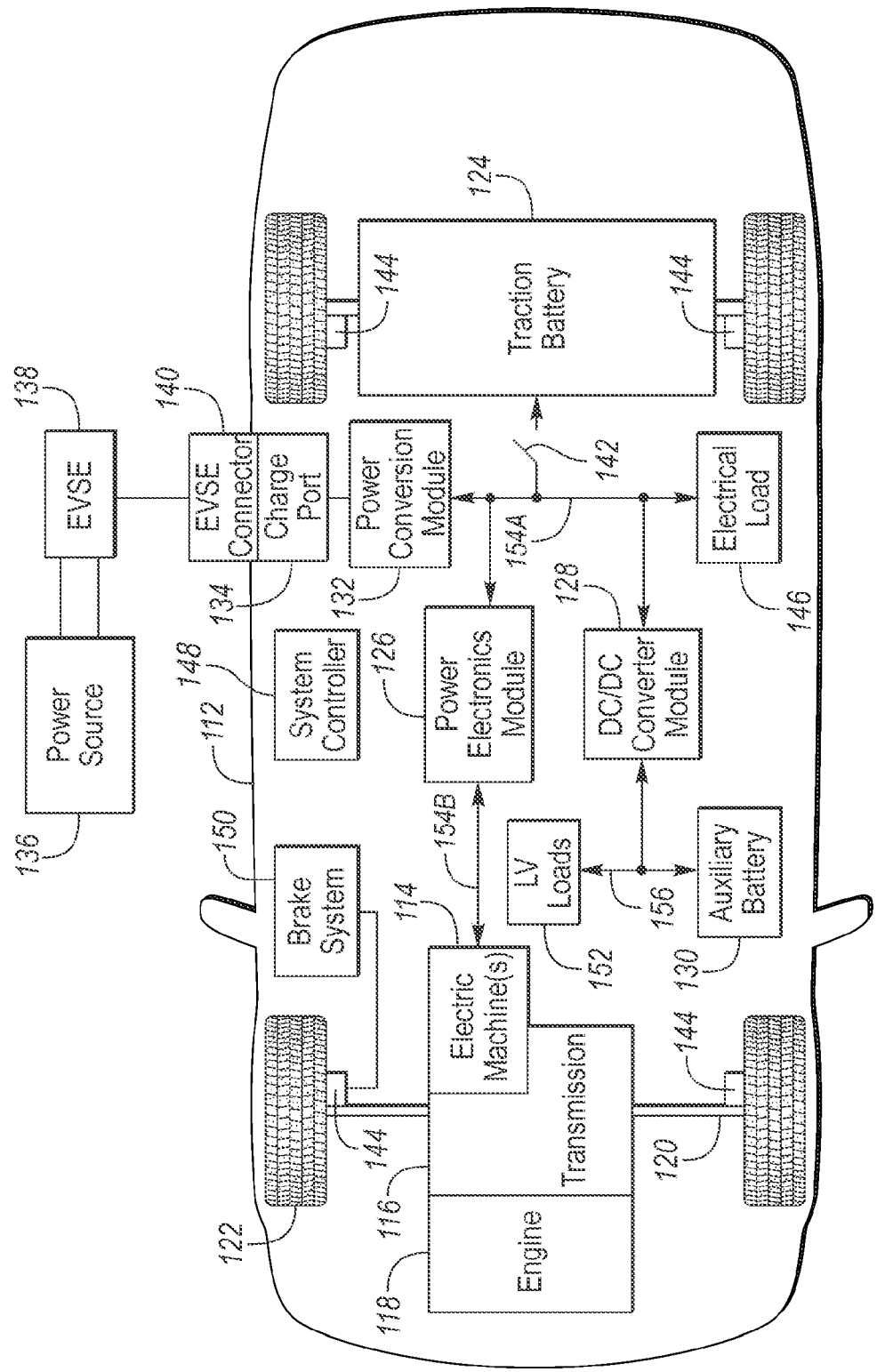
FIG. 1 is a schematic diagram of a hybrid vehicle.

FIG. 1 depicts a plug-in hybrid-electric vehicle (PHEV). A PHEV 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability either while the engine 118 is operated or turned off. The electric machines 114 are capable of operating as generators and provide fuel economy benefits by recovering energy that would normally be lost as heat in a friction braking system. The electric machines 114 may additionally impart a reaction torque against the engine output torque to generate electricity for recharging a traction battery the while the vehicle is operating. The electric machines 114 may further reduce vehicle emissions by allowing the engine 118 to operate near the most efficient speed and torque ranges. When the engine 118 is off, the PHEV 112 may be operated in electric-only mode using the electric machines 114 as the sole source of propulsion. The output control precision achievable by the electric machines 114 eliminates the need for a torque converter that is required to bypass torque in a vehicle standstill condition in a conventional internal combustion powertrain. As discussed in greater detail below, in a standstill condition of a hybrid vehicle according to the present disclosure, the engine 118 may be disabled or disconnected and no power supplied to the electric machines 114.

A traction battery, or battery pack, 124 stores energy that can be used by the electric machines 114. The battery pack 124 typically provides a high-voltage direct current (DC) output. One or more contactors 142 may isolate the traction battery 124 from a DC high-voltage bus 154A when opened and couple the traction battery 124 to the DC high-voltage bus 154A when closed. The traction battery 124 is electrically coupled to one or more power electronics modules 126 via the DC high-voltage bus 154A. The power electronics module 126 is also electrically coupled to the electric machines 114 and provides the ability to bi-directionally transfer energy between AC high-voltage bus 154B and the electric machines 114. For example, a traction battery 124 may provide a DC current while the electric machines 114 may operate using a three-phase alternating current (AC) to function. The power electronics module 126 may convert the DC current to a three-phase AC current to operate the electric machines 114. In a regenerative mode, the power electronics module 126 may convert the three-phase AC current output from the electric machines 114 acting as generators to the DC current compatible with the traction battery 124. The description herein is equally applicable to a pure electric vehicle.

In addition to providing energy for propulsion, the traction battery 124 may provide energy for other vehicle electrical systems. A vehicle 112 may include a DC/DC converter module 128 that is electrically coupled to the high-voltage bus 154. The DC/DC converter module 128 may be electrically coupled to a low-voltage bus 156. The DC/DC converter module 128 may convert the high-voltage DC output of the traction battery 124 to a low-voltage DC supply that is compatible with low-voltage vehicle loads 152. The low-voltage bus 156 may be electrically coupled to an auxiliary battery 130 (e.g., 12V battery). The low-voltage systems 152 may be electrically coupled to the low-voltage bus 156. The low-voltage system 152 may include various controllers within the vehicle 112.

The traction battery 124 of vehicle 112 may be recharged by an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

Other vehicle configurations may benefit from aspects of the present disclosure. In addition to illustrating a plug-in hybrid vehicle, FIG. 1 can be representative of a battery electric vehicle (BEV) configuration if the engine 118 is removed. FIG. 1 could also represent a traditional hybrid electric vehicle (HEV) or a power-split hybrid electric vehicle if the components 132, 134, 136, 138, and 140 that are related to plug-in charging are removed. A further example vehicle configuration which may benefit from aspects disclosed herein is a conventional vehicle having the internal combustion engine 118 as the sole propulsion source. Such a conventional vehicle may not include an electric machine 114 or traction battery 124 to provide vehicle traction but may contain a slipping clutch that could overheat or wear, similar to the electric machine overheat condition.

One or more friction brakes 144 may be provided for resisting rotation of the wheels in order to decelerate the vehicle 112 or prevent vehicle movement altogether. The friction brakes 144 may be hydraulically actuated, electrically actuated, or some combination thereof. The friction brakes 144 may be a part of a brake system 150 which includes other components to operate the friction brakes 144. For simplicity, the figure depicts a single connection between the brake system 150 and one of the friction brakes 144. A connection between the brake system 150 and the other friction brakes 144 is implied. The brake system 150 may also include a controller to monitor and coordinate the brake system 150. The brake system 150 may monitor the brake components and regulate pressure applied by the friction brakes 144 to control vehicle deceleration. The brake system 150 may respond to driver commands via a brake pedal. As discussed in more detail below, the brake system may also operate autonomously to implement advanced features such as stability control and vehicle hold on an incline. The controller of the brake system 150 may implement a method of applying a predetermined brake force when requested by another controller or sub-function.

One or more high-voltage electrical loads 146 may be coupled to the high-voltage bus 154. The high-voltage electrical loads 146 may have an associated controller that operates and controls the high-voltage electrical loads 146 when appropriate. For example, high-voltage loads 146 may include compressors and electric heaters that are part of a climate control system.

The various components discussed may have one or more associated controllers to control and monitor the operation of the components. The controllers may communicate via a serial bus (e.g., Controller Area Network (CAN)) or via discrete conductors. In addition, a system controller 148 may be present to coordinate the operation of the various components.

During an ignition-off condition, the contactors 142 may be in an open state so that the traction battery 124 does not provide power to the high-voltage bus 154. During the ignition-off condition, the traction battery 124 may be decoupled from the auxiliary battery 130. During the ignition-off condition, selected electronic modules (e.g., low-voltage loads 152) may remain active. For example, a theft-deterrent system and a remote keyless entry system may continue to be active. The active systems may draw current from the auxiliary battery 130. In some configurations, low-voltage loads 152, such as lamps, may be accidently left in an active condition and draw current from the auxiliary battery 130, which may increase a rate of discharge of the auxiliary battery 130. During the ignition-off condition, the low-voltage loads 152 may be configured to minimize current draw.

System controller 148, although represented as a single controller, may be implemented as one or more controllers. The controller 148 may monitor operating conditions of the traction battery 124, the power conversion module 132, the electric machine 114, and the brake system 150. The traction battery 124 includes a current sensor to sense a current that flows through the traction battery 124. The traction battery 124 also includes a voltage sensor to sense a voltage across terminals of the traction battery 124. The voltage sensor may output a signal indicative of the voltage across the terminals of the traction battery 124. The traction battery current sensor may output a signal of a magnitude and direction of current flowing into or out of the traction battery 124.

The power conversion module 132 also includes a current sensor to sense a current that flows from the EVSE 138 to the traction battery 124. The engine 118 coupled to the electric machine 114 generates an AC current that is converted to a DC current by the power electronics module 126. The engine 118 may be controlled by a powertrain control module having at least one controller in connection with the system controller 148. The current sensor of the power conversion module 132 may output a signal indicative of a magnitude and direction of current flowing from the EVSE 138 to the traction battery 124.

The controller 148 may include a processor that controls at least some portion of the operation of the controller 148. The processor allows onboard processing of commands and routines. The processor may be coupled to non-persistent storage and persistent storage. In an illustrative configuration, the non-persistent storage is random access memory (RAM) and the persistent storage is flash memory. In general, persistent (non-transitory) storage can include all forms of storage that maintain data when a computer or other device is powered down.

The current sensor and voltage sensor outputs of the traction battery 124 are provided to the controller 148. The controller 148 may be programmed to compute a state of charge (SOC) based on the signals from the current sensor and the voltage sensor of the traction battery 124. Various techniques may be utilized to compute the state of charge. For example, an ampere-hour integration may be implemented in which the current through the traction battery 124 is integrated over time. The state of charge may also be estimated based on the output of the traction battery voltage sensor 104. The specific technique utilized may depend upon the chemical composition and characteristics of the particular battery.

The controller 148 may also be configured to monitor the temperature of the traction battery 124 so as to avoid or mitigate undesirable operating temperatures.

Under certain circumstances, a vehicle can in a situation where positive wheel torque is demanded without a desire for the vehicle to move. This may occur, for example, when the driver attempts to hold the vehicle position at a standstill while on an incline by using only the accelerator pedal. This condition may also occur or when one wheel is in a hole and is attempting to get out, or when the driver attempts to slowly climb a curb. In a conventional automatic transmission, the torque converter bypasses torque output of the engine allowing conditions where the engine spins while the drivetrain remains still. Once enough torque builds up at the torque converter fluid connection, the vehicle moves forward. However, in a hybrid power split or all-electric powertrain as described in the present disclosure, the absence of a torque converter causes the three-phase electric motor to apply torque in response to demand indicated by the accelerator pedal, even though the rotor is not moving. In a permanent magnet electric machine, this could cause current to be more heavily concentrated in one phase of both the inverter and the motor. Concentrated current in one phase can cause the electric machine (or the inverter) to rapidly overheat. In turn, the overheating can cause the vehicle to be incapable of launching from the standstill, or even shutdown the powertrain based on the designed hardware protection strategies. In the case of a slipping clutch it may be similarly undesirable to incur extended periods of rotating the engine shaft when the vehicle is at a standstill. This condition increases heat generated at the clutch and accelerates component wear.

The controller 148 is programmed to detect when certain standstill conditions are met, and then issue commands to cause the friction brake to automatically apply resistive torque to hold the vehicle at a standstill instead of using powertrain torque to accomplish this result. Relieving the electrical load from the electric machine can prevent overheating of the powertrain due to torque output while the rotor speed is held at substantially zero. The output torque of the powertrain may be substantially reduced to avoid overheating of components related to holding vehicle position in a standstill condition.

According to aspects of the present disclosure the control system will enter a friction brake standstill mode if the vehicle is in a motive gear and the output torque at the one or more wheels is positive while the vehicle speed is substantially zero. The controller will then command the brake system to engage the friction brakes based on the current grade. Once resistive brake torque has been applied, the system will then reduce the powertrain torque to zero. The controller may also set a powertrain output torque value associated with the amount of torque required to hold the vehicle at a standstill. Determining the standstill torque each time the standstill mode is entered accounts for any of a range of different incline angles as well as other vehicle operating conditions such as a curb climb or moving the vehicle wheels to exit a significant depression or hole. Once standstill mode is entered, the controller continues to monitor the driver torque request until it determines a driver's intention to exit the standstill mode. In alternative embodiments, a grade sensor may be provided to output a signal to inform the controller when the vehicle is on an incline grade.

Figure 2:
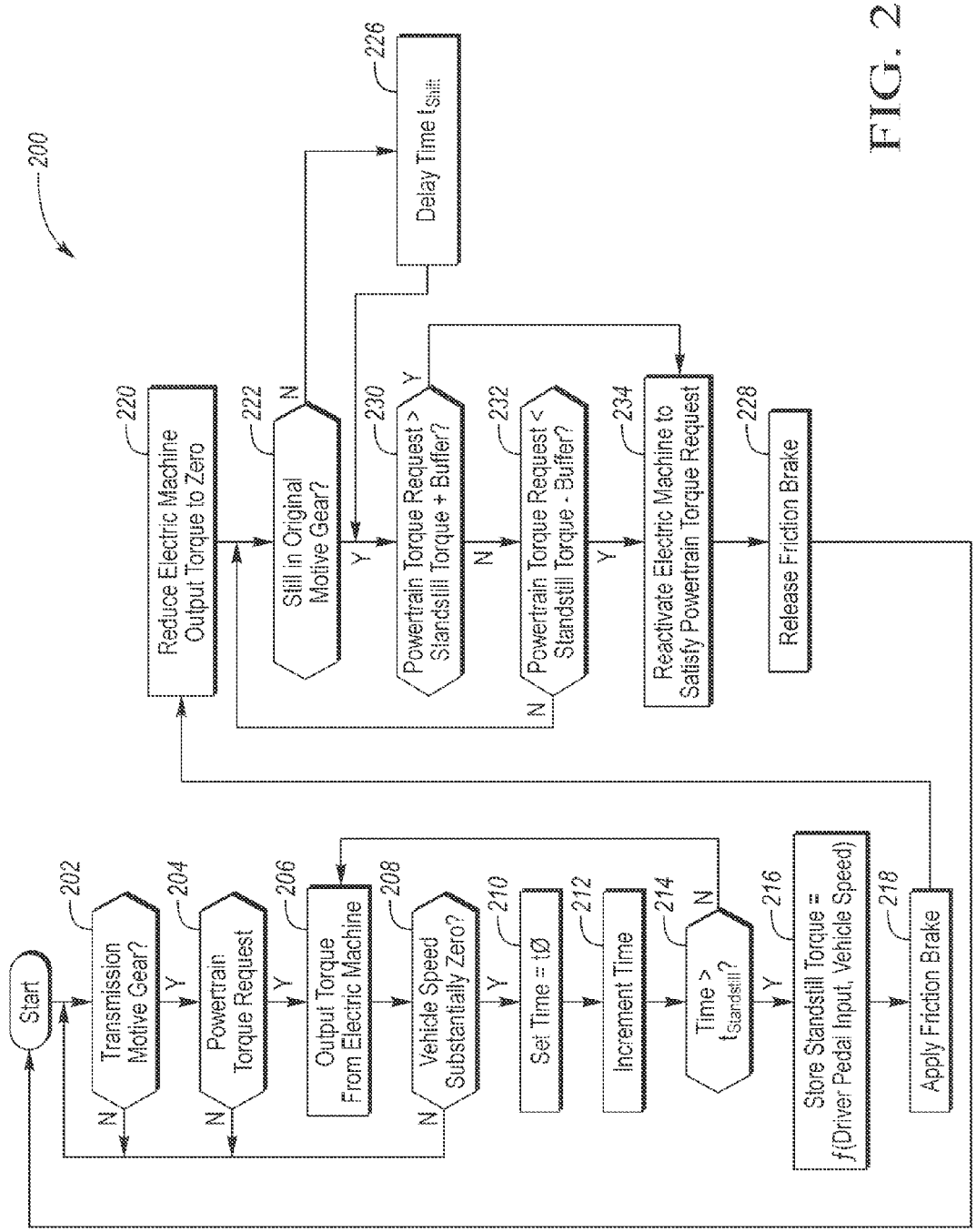
FIG. 2 is a flowchart of a method of managing torque at a vehicle standstill condition.

FIG. 2 is a flowchart of a method 200 to automatically supplant powertrain output torque with friction brake resistive torque during certain vehicle standstill conditions. At step 202, the controller assesses the transmission mode to determine whether or not the vehicle is in a motive gear. For example, each of "drive," "reverse," "low," and "sport" transmission modes may be considered motive modes and allow for the controller to engage friction brake standstill mode.

If the vehicle transmission is in a motive mode at step 202, the controller considers the driver torque demand at step 204. Driver torque demand may be determined by the amount of input at the accelerator pedal. For example the accelerator pedal angle may indicate a driver's intent to hold the vehicle at standstill without accelerating. Additionally, even at zero vehicle speed there may be a positive torque demand value, corresponding to a simulated "creep" torque such as that found in a conventional transmission having a torque converter.

If there is driver accelerator pedal input indicative of a torque demand, the controller activates the electric machine. At step 206, the controller may issue a command to provide current to the electric machine causing it to provide output torque at the output shaft corresponding to the driver torque demand.

The controller monitors vehicle speed and determines whether the driver is applying just enough accelerator pedal input to indicate a desire to hold the vehicle at a standstill. If at step 208 the vehicle speed is substantially zero, the vehicle is determined to be at standstill. The controller then assesses the amount of time held in this condition. At step 210 the controller starts a timer by setting a time t0 as a baseline to begin counting. At step 212 the counter increments the time step to track the duration for which the vehicle is held at standstill using torque output from the electric machine.

If at step 214 the duration of time over which the vehicle is held at standstill exceeds a time threshold $t_{Standstill}$, the controller enters the friction brake standstill portion of the control algorithm. If at step 214 the time has not exceeded the time threshold $t_{Standstill}$, the controller continues allow output torque from the electric machine and monitors the cumulative time over which the vehicle is held at standstill.

At step 216 the controller stores a value of standstill torque $T_{standstill}$ that is based on the driver torque demand at the accelerator pedal which corresponds to vehicle speed being substantially zero over a predetermined duration of time. In alternative embodiments, the controller may rely on a signal from a sensor indicating an incline angle of the vehicle. In response to a vehicle standstill on an incline grade greater than a predetermined threshold, the controller may store the powertrain output value corresponding to zero vehicle speed on the incline grade.

At step 218 the controller issues a command to cause application of at least one friction brake to resist wheel rotation of one or more vehicle wheels. As discussed in more detail below, the amount of brake pressure may be based on generating brake resistive torque that exceeds the standstill torque by a predetermined amount. More specifically, the friction brakes may be applied with sufficient pressure to correspond to a target brake resistive torque $T_{brake}$, which is selected each time entering standstill mode based on the determination of $T_{standstill}$. At step 220 the controller issues a command to reduce current supplied to the electric machine. Output torque of the electric machine is reduced to zero. The controller may exit friction brake standstill mode either by a significant change in driver accelerator pedal input or if the vehicle is shifted out of the original motive transmission gear.

At step 222 if the powertrain is shifted out of the original motive gear the controller prepares to exit friction brake standstill mode. In one example, shifting from either "drive" or "reverse" into "park" may trigger such a transition out of standstill mode. In another example, a shift from "drive" to "reverse" may indicate a driver intention to change direction and similarly prompt an exit from standstill mode. Although a user input to change transmission gears is received, the controller causes a predetermined delay $t_{Shift}$ at step 226 prior to re-assessing criteria for remaining in standstill mode in order to allow for completion of the gear shift before releasing the friction brake. The predetermined delay time may be implemented when shifting gears before applying the gear or new torque map as well as when exiting the standstill mode. Conversely, in further examples, a shift between more closely related drive modes may not cause a delay prior to exiting standstill mode. That is, the controller may continuously monitor torque demand with regard to the transmission gear change. In one example, a shift from "drive" into a related "low" or "sport" gear may not automatically prompt a predicate delay prior to exiting standstill mode.

If at step 222 the transmission remains in the same motive gear as when it entered into standstill mode the controller monitors whether a change in accelerator position indicates an intention driver by the driver to move the vehicle. The controller establishes a predetermined torque band with limits above and below the powertrain torque demand corresponding to $T_{standstill}$ used to hold the vehicle at standstill. While the powertrain torque demand remains in this region, the vehicle will remain in standstill mode, and the brakes will remain applied. Use of a torque band about the powertrain torque demand corresponding to $T_{standstill}$ is designed so that the vehicle remains at a standstill while the driver holds the accelerator pedal in relatively the same position, and accounts for small adjustments or twitches in the driver's foot.

If at step 230 the driver pedal input corresponds to a torque demand which is greater than a torque threshold equal to $T_{standstill}$ plus a predetermined buffer amount, the controller issues a command at step 234 to reactivate the electric machine. If at step 230 the driver pedal input corresponds to a torque demand that is less than the upper end of the torque band, the controller assesses the lower end of the torque band at step 232. That is, the controller determines at step 232 whether driver pedal input corresponds to a torque request that is less than a torque threshold equal to $T_{standstill}$ minus a predetermined buffer amount. If the torque request decreases to less than the lower torque band threshold, the controller issues a command at step 234 to reactivate the electric machine to satisfy the torque request. The lower end of the torque band may relate to a low torque request where the driver intends for the powertrain to output less than $T_{standstill}$, for example to purposely allow the vehicle to roll down the incline.

Once powertrain torque is increased to equal to driver demanded torque, the controller will disengage the standstill mode. At step 228 the controller issues a command to release the friction brake. The vehicle then resumes normal powertrain operation outside of friction brake standstill mode.

The controller repeats the loop of method 200 to account for traffic conditions including high frequency stop and go occurrences when the vehicle is on an incline. In such cases driver may wish to hold the vehicle a standstill repeatedly while waiting for the next opportunity to move forward. Therefore the controller is programmed to continually monitor duration of standstill each time the vehicle is held at standstill using torque output from the electric machine. When practical (i.e., after the predetermined time duration discussed above) the controller employs the friction brake to relieve the electric machine from outputting torque to maintain a vehicle standstill condition.

Figure 3:
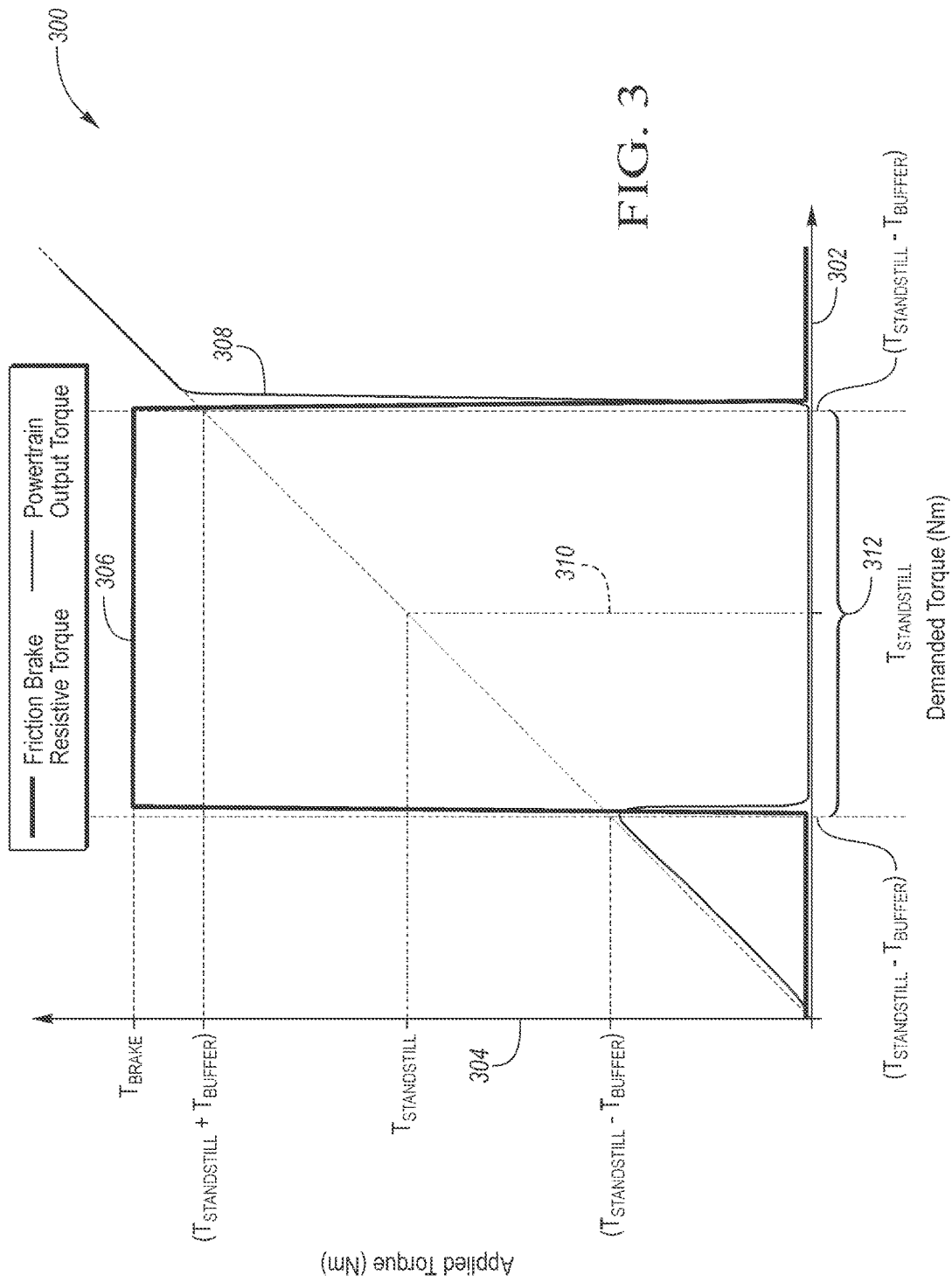
FIG. 3 is a plot of torque output for a drive train in a standstill mode.

FIG. 3 include plot 300 which provides a graphical representation of aspects of the present disclosure. The plot represents the application of powertrain output torque and friction brake torque once the vehicle has entered friction brake standstill mode. Horizontal axis 302 represents demanded torque which may be based on an accelerator pedal position as influenced by a driver. Vertical axis 304 represents applied torque, whether output torque provided by the powertrain or resistive torque applied by the friction brake.

As discussed above, the controller determines a driver intention to hold the vehicle at standstill indicated by a driver torque demand corresponding to a torque output that causes substantially zero vehicle speed. The then controller enters friction brake standstill mode. Curve 306 represents resistive torque applied by the vehicle brake system. Curve 308 represents powertrain output torque. In the case of a vehicle on an incline, the resistive torque from the brake system preventing backward roll is in the same direction as the propulsion torque in the uphill direction which also opposes backward roll.

Once the controller determines standstill torque 310, the friction brake applies all torque to hold the vehicle position and the powertrain is deactivated to provide zero torque. The controller also establishes a buffer range, or torque band, 312 bi-directionally straddled about the standstill torque such that as long as driver demand remains in the range the torque resisting movement is provided by the friction brake. Once the driver torque demand shifts corresponding to torque demand that is outside of the bidirectional torque band 312, the electric machine is reactivated. On the upper end of the torque band, increased torque demand may indicate a driver's intention to propel the vehicle forward. On the lower end of the torque band, reduced torque demand may indicate a driver's intention to allow the vehicle to roll backward down the incline. In either case the friction brake is released and normal operation of the powertrain is resumed.

While the bidirectional torque band 312 is depicted as symmetrically balanced about the standstill torque 310, there may be conditions under which it is desirable to achieve a more rapid response on either the upper end or the lower end of the torque band compared to the other. In one example (not shown), the upper end of the band may be closer to the standstill torque to provide a more rapid acceleration response and exit friction brake standstill mode as the driver depresses the accelerator pedal.

Also discussed above, the resistive brake torque applied during standstill mode is set to a value greater than the torque value of the upper end of the torque band. In alternative embodiments, the resistive torque applied by the friction brake is tailored to match torque demand. In this way transitions into and out of standstill mode may be smoother when the friction brake is released in favor of powertrain output torque. In additional embodiments, the resistive brake torque is set to a value determined by a table using a measurement of the incline grade of the vehicle, plus a predetermined additional torque value.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method comprising:
   outputting torque from a powertrain to satisfy a driver torque demand;
   responsive to a nonzero torque demand resulting in vehicle standstill, applying a friction brake to maintain the vehicle standstill and reducing output torque of the powertrain during friction brake application;
   maintaining application of the friction brake for a predetermined duration of time following a shift from a motive transmission gear to a non-motive transmission gear; and
   responsive to the driver torque demand deviating from the nonzero torque demand by more than a predetermined amount, satisfying driver torque demand using the powertrain and releasing the friction brake.

2. The method of claim 1 wherein applying the friction brake occurs after a vehicle speed is zero for a predetermined duration of time.

3. The method of claim 1 wherein applying the friction brake produces a resistive torque that exceeds a standstill torque by a predetermined amount.

4. A vehicle comprising:
   a powertrain configured to output torque to satisfy driver torque demand; and
   a controller programmed to
   responsive to a nonzero torque demand resulting in vehicle standstill, apply a friction brake to maintain the vehicle standstill and reduce output torque of the powertrain during friction brake application;
   maintain application of the friction brake for a predetermined duration of time following a shift from a motive transmission gear to a non-motive transmission gear; and
   responsive to the driver torque demand deviating from the nonzero torque demand by more than a predetermined amount, satisfying driver torque demand using the powertrain and releasing the friction brake.

5. The vehicle of claim 4 wherein the applying occurs after a vehicle speed is zero for a predetermined duration of time.

6. The vehicle of claim 4 wherein the applying produces a resistive torque that exceeds a standstill torque by a predetermined amount.

* * * * *